US012115128B2

(12) United States Patent
Wagner

(10) Patent No.: US 12,115,128 B2
(45) Date of Patent: Oct. 15, 2024

(54) CLOSURE FOR MEDICAMENT CONTAINER

(71) Applicant: Sanofi, Paris (FR)

(72) Inventor: Daniel Wagner, Frankfurt am Main (DE)

(73) Assignee: Sanofi, Paris (FR)

(*) Notice: Subject to any disclaimer, the term of this patent is extended or adjusted under 35 U.S.C. 154(b) by 162 days.

(21) Appl. No.: 17/634,398

(22) PCT Filed: Aug. 17, 2020

(86) PCT No.: PCT/EP2020/072945
§ 371 (c)(1),
(2) Date: Feb. 10, 2022

(87) PCT Pub. No.: WO2021/032653
PCT Pub. Date: Feb. 25, 2021

(65) Prior Publication Data

US 2022/0296470 A1 Sep. 22, 2022

(30) Foreign Application Priority Data

Aug. 21, 2019 (EP) .................................... 19306021

(51) Int. Cl.
*A61J 1/14* (2023.01)
*B65D 51/00* (2006.01)
*B65D 51/20* (2006.01)

(52) U.S. Cl.
CPC ........... *A61J 1/1412* (2013.01); *A61J 1/1406* (2013.01); *B65D 51/002* (2013.01); *B65D 51/20* (2013.01);
(Continued)

(58) Field of Classification Search
CPC ..... A61J 1/1412; A61J 1/1406; B65D 51/002; B65D 2401/15
See application file for complete search history.

(56) References Cited

U.S. PATENT DOCUMENTS 5,823,373 A 10/1998 Sudo et al.
5,857,580 A 1/1999 Iidaka
(Continued)

FOREIGN PATENT DOCUMENTS

CN 101287553 A 10/2008
CN 102259723 A 11/2011
(Continued)

OTHER PUBLICATIONS

International Search Report and Written Opinion in International Appln. No. PCT/EP2020/072945, dated Nov. 23, 2020, 10 pages.
(Continued)

*Primary Examiner* — Anthony D Stashick
*Assistant Examiner* — L Kmet
(74) *Attorney, Agent, or Firm* — Fish & Richardson P.C.

(57) ABSTRACT

The present disclosure relates to a closure cap for sealing an outlet end of a barrel of a medicament container, the outlet end having a radially widened rim and the outlet end being sealable by an elastomeric seal, wherein the elastomeric seal comprises a flange portion configured to abut in a longitudinal direction with the outlet end, the closure cap comprising: a cap body comprising a retainer portion and a fastening portion, wherein the retainer portion is configured to engage with the elastomeric seal, wherein the fastening portion comprises a resiliently and radially deformable fastener comprising a snap feature configured to releasably engage with the radially widened rim of the outlet and, and wherein a longitudinal distance between the retainer portion and the snap feature is sized to receive the radially widened rim and the flange portion of the elastomeric seal between the retainer portion and the snap feature.

18 Claims, 3 Drawing Sheets

(52) U.S. Cl.
CPC ................ *B65D 2251/0015* (2013.01); *B65D 2251/009* (2013.01); *B65D 2401/15* (2020.05)

(56) References Cited

U.S. PATENT DOCUMENTS

| | | | | |
|---|---|---|---|---|
| 5,901,866 | A | 5/1999 | Storar | |
| 6,223,918 | B1 | 5/2001 | Browne | |
| 6,793,082 | B1 | 9/2004 | Long, Jr. | |
| 2006/0243756 | A1* | 11/2006 | Kawakita | B65D 51/1683 222/185.1 |
| 2008/0000870 | A1* | 1/2008 | Lopez Alvarez | B65D 51/18 215/355 |
| 2017/0297781 | A1 | 10/2017 | Kawamura | |

FOREIGN PATENT DOCUMENTS

| | | | | |
|---|---|---|---|---|
| CN | 103459259 | A | 12/2013 | |
| CN | 104210742 | A | 12/2014 | |
| CN | 105819082 | A | 8/2016 | |
| DE | 4029832 | | 3/1992 | |
| DE | 4228090 | A1 | 3/1994 | |
| EP | 842862 | A2 * | 5/1998 | B65D 41/3409 |
| GB | 854571 | A | 11/1960 | |
| JP | H11-153510 | A | 6/1999 | |
| JP | 2007-216986 | A | 8/2007 | |
| JP | 2007-216987 | A | 8/2007 | |
| JP | 2008-001430 | A | 1/2008 | |
| JP | 2008-050057 | A | 3/2008 | |
| JP | 2010-260613 | A | 11/2010 | |
| KR | 10-1868822 | B1 | 6/2018 | |
| WO | WO 1998/021111 | A1 | 5/1998 | |

OTHER PUBLICATIONS

International Preliminary Report on Patentability in International Appln. No. PCT/EP2020/072945, dated Mar. 3, 2022, 7 pages.

* cited by examiner

CLOSURE FOR MEDICAMENT CONTAINER

CROSS REFERENCE TO RELATED APPLICATIONS

The present application is the national stage entry of International Patent Application No. PCT/EP2020/072945, filed on Aug. 17, 2020, and claims priority to Application No. EP 19306021.7, filed on Aug. 21, 2019, the disclosures of which are incorporated herein by reference.

TECHNICAL FIELD

The present disclosure relates to the field medicament containers, such as bottles, cartridges, carpules or vials. In particular, the disclosure relates to a primary packaging configured to accommodate a liquid medicament. The primary packaging, such as a bottle, a cartridge, a vial, or a carpule or is typically filled with a liquid medicament, e.g. with an injectable liquid medicament.

BACKGROUND

Medicament containers such as bottles, cartridges, carpules or vials comprise an outlet end that has to be closed and sealed in a liquid tight and/or gas tight manner. Since the interior of the medicament container has to be sterile the seal is typically non-detachably fixed on or at the outlet end of the medicament container. The seal may be penetrable by a piercing element, such as a cannula or an injection needle in order to enable withdrawal or expelling of a liquid into the interior of the medicament container and/or for withdrawing or expelling a liquid substance, e.g. a liquid medicament from the interior of the medicament container.

SUMMARY

The medicament container may be filled with a liquid, e.g. an injectable medicament. The medicament container may also accommodate a lyophilized medicament. Here, the seal may be penetrated by some type of administering device in order to add a solvent or diluent into the interior of the medicament container in order to prepare or to reconstitute the liquid medicament inside the medicament container.

In order to conduct a container closure integrity test there may be provided particularly prepared medicament containers that are sealed by commercially available seals. For the purpose of conducting a container closure integrity testing and/for conducting a leakage test, e.g. a helium leakage test, the medicament container may be particularly prepared. Here, a barrel of the medicament container may comprise well-defined through openings, e.g. laser drilled holes of comparatively small size defining a certain leakage rate when the interior of the sealed container is subject to a pressure that differs from an ambient pressure.

Barrels for medicament containers particularly designed or prepared for container closure integrity testing are quite expensive. Moreover, such barrels may be made of a vitreous and hence brittle material, such as glass. Conventional closure caps for sealing the outlet end of a barrel typically comprise a beaded metal cap that is crimped by a particular tool to the outlet end of the barrel in order to fix the seal to the outlet end. If one and the same test barrel should be used with a series of seals the disassembly of a crimped metal cap from the outlet end is quite cumbersome for an operator. Moreover, such a disassembly typically comes along with an increased risk of damaging the barrel of the container.

It is therefore desirable to provide an improved closure for a medicament container, wherein the closure enables a detachable fixing of an elastomeric seal to an outlet end of a barrel of the medicament container. The container closure should be easy and simple in its overall handling. The assembly and disassembly of the closure should be intuitively understandable. The closure should provide a durable and robust as well as leak-proof attachment and fixing of the elastomeric seal to the outlet end of the medicament container. Additionally, the closure should be easy to manufacture at moderate costs.

In one aspect there is provided a closure cap for sealing an outlet end of a barrel of a medicament container. The outlet end of the barrel has a radially widened rim. The outlet end is further sealable or is sealed by an elastomeric seal. The elastomeric seal comprises a flange portion. The flange portion is configured to abut in a longitudinal direction with the outlet end of the barrel. Here, and in the present context, the longitudinal direction may coincide with an axial direction. The longitudinal direction and/or the axial direction may extend parallel or may coincide with a longitudinal central axis of e.g. a tubular-shaped barrel or the medicament container.

The closure cap comprises a cap body. The cap body comprises a retainer portion and a fastening portion. The retainer portion is configured to engage with the elastomeric seal. The fastening portion is configured to engage with the radially widened rim of the outlet end.

The fastening portion comprises a resiliently and radially deformable fastener. The fastener comprises a snap feature that is configured to releasably engage with the radially widened rim of the outlet end of the barrel.

Moreover, a longitudinal distance or axial distance between the retainer portion and the snap feature is sized to receive the radially widened rim of the outlet end and the flange portion of the elastomeric seal between the retainer portion and the snap feature. In this way, and by appropriately designing the distance between the retainer portion engageable with the elastomeric seal and the snap feature engageable with an outside of the radially widened rim a snap fit connection and/or a positive fit can be provided between the closure cap and the barrel of the medicament container.

The resiliently and radially deformable fastener enables a well-defined detachment and release of the snap feature from the radially widened rim if a user applies a pull up force above a predefined threshold force. In this way the closure cap provides a snap fit connection and snap fit-based fixing of the elastomeric seal to the outlet end of the barrel of the medicament container. Such a snap fit connection is particularly useful for medicament containers particularly prepared for gas leakage testing, e.g. for the purpose of conducting a container closure integrity testing. With the snap feature of the fastening portion configured to releasably engage with the radially widened rim of the outlet end a likelihood and a danger of damaging the barrel upon removal or detachment of the closure cap from the outlet end of the barrel is substantially decreased. The overall lifetime of particularly configured and prepared barrels for leakage testing purpose can be thus increased.

According to a further example the longitudinal distance between the retainer portion and the snap feature is less than or equal to the sum of a longitudinal extension of the radially widened rim of the outlet end and a longitudinal thickness of the flange portion of the elastomeric seal. When appropriately assembled to the outlet end of the barrel the flange portion of the elastomeric seal is in direct longitudinal or axial abutment with a distal end face of the barrel. The distal end face of the barrel may contribute to the radially widened rim. The radially widened rim extends in longitudinal direction from the distal end face to a proximal abutment face coinciding with a stepped down portion of the radially widened rim. This abutment face or contact surface of the proximal end of the radially widened rim is configured to engage with the snap feature of the fastening portion. Typically, the snap feature of the fastening portion protrudes radially inwardly and grips under the abutment face or contact surface at the proximal end of the radially widened rim. The radially widened rim is typically a radially outwardly protruding rim.

When the longitudinal distance between the retainer portion and the snap feature is less than the sum of the longitudinal extension of the radially widened rim and the longitudinal thickness of the flange portion the snap fit engagement between the snap feature and the radially widened rim is only obtained with an at least slight axial or longitudinal compression of the elastomeric seal. In this way the sealing capability of the elastomeric seal and the container closure integrity can be increased. In such a configuration, the seal is pre-tensed and is kept in a pre-tensed or pre-biased, e.g. slightly squeezed state on or at the outlet end of the barrel.

With other examples, wherein the longitudinal distance between the retainer portion and the snap feature is equal or substantially equal to the sum of the longitudinal extension of the radially widened rim and the longitudinal thickness of the flange portion at least a slack-free fixing and attachment of the elastomeric seal to the outlet end can be reached.

According to another example the cap body of the closure cap comprises a lid portion and a sidewall. The lid portion and the sidewall form a cup-shaped receptacle. The cup-shaped receptacle is configured to receive the radially widened rim of the outlet end and the flange portion of the elastomeric seal. The cup-shaped receptacle is sized and configured to receive the radially widened rim and the flange portion only when the elastomeric seal is attached to the outlet end, e.g. when at least a portion of the elastomeric seal is located inside the outlet end of the barrel.

The lid portion may comprise a closed lid portion. The lid portion may comprise a substantially even or flat-shaped disc covering the entirety or at least a portion of the outside surface of the seal. The lid portion may comprise or may form an abutment face facing towards and getting in direct abutment with the outside surface of the elastomeric seal when appropriately assembled. The lid portion may be void of any through openings or recesses. The lid portion may be a closed lid portion. The lid portion is impenetrable for syringes or other piercing tools. The lid portion provides a comparatively high mechanical resistivity against puncturing.

The sidewall may be of cylindrical or tubular shape. The sidewall and the lid portion may be integrally formed. The sidewall may extend substantially parallel to a surface normal of at least a lower side of the lid portion. The sidewall may extend away from the lid portion in a direction substantially parallel to the abutment face of the lid portion. The sidewall may be void of any longitudinal slits or recesses. In this way, the sidewall features a comparatively high degree of mechanical stability and/or stiffness. The mutual interconnection of the sidewall and the lid portion provides a mutual stabilizing of the lid portion and the sidewall. In other words, the sidewall connected to the lid portion provides a strengthening and an increase of rigidity of the lid portion. Put the other way around the lid portion also enhances the stiffness and the rigidity of the sidewall.

With some examples the fastening portion is integrated into the sidewall. With some examples the fastening portion is formed or constituted by the sidewall. In other words, the fastening portion and the sidewall may coincide.

Moreover, the cup-shaped receptacle formed by the sidewall and the lid portion is void of any through openings or recesses. Apart from a lower end of the sidewall opposite to the lid portion the cup-shaped receptacle does not comprise any openings. In this way and when appropriately attached to the outlet end of the barrel the closed cup-shaped receptacle provides a rather effective protection of the elastomeric seal against environmental influences, such as electromagnetic radiation, humidity and/or particles, such as dust. Typically, the closure cap is non-transparent for electromagnetic radiation in at least one of the visible spectral range, the infrared spectral range and the UV spectral range. In this way, the closure cap serves and provides a long-term protection for the elastomeric seal.

According to another example the snap feature comprises a protrusion protruding from an inside surface of the sidewall. The protrusion of the snap feature may comprise at least one beveled edge and/or a lead-in chamfer. This enables and facilitates a mechanical snap fit engagement with at least one of the flange portion of the elastomeric seal and the radially widened rim of the outlet end of the barrel. The protrusion serves to flex or to deform the fastener and hence the entire fastening portion, e.g. the entire sidewall radially outwardly in the course of attaching the closure cap on the radially widened rim of the outlet end.

When the protrusion has passed the radially widened rim in longitudinal direction it may snap under the recessed portion of the radially widened rim under the effect of inherent resilient restoring forces. Typically, the protrusion comprises beveled edges at a distal end, i.e. that end facing towards the retainer portion and at a proximal end, i.e. that end facing away from the retainer portion. The proximally facing beveled edge, e.g. implemented as a lead-in chamfer helps and/or supports to radially widen the sidewall and/or to radially outwardly displace the fastening portion and the fastener in the course of urging or depressing the closure cap in proximal direction onto the outlet end. The distally facing beveled edge of the radially inwardly protruding protrusion is effective to induce a radial widening and/or a radially outwardly directed displacement or deformation of the fastening portion and/or of the fastener in the course of detaching the closure cap from the outlet end.

Typically, the distally facing beveled edge is steeper than the proximally facing beveled edge. In this way, attaching of the closure cap to the outlet end may require an assembly force that is smaller than a pull off force required for detaching the closure cap from the outlet end.

According to a further example the sidewall of the cap body is of tubular shape. Moreover, the snap feature comprises a radially inwardly protruding rim. Both, the sidewall and the snap feature may be void of any recesses, slits or through openings. In this way, a tensionally and mechanically stable sidewall and/or a respective snap feature can be provided. Even if the closure cap, typically made of a polymeric or plastic material, should become subject to creep a reliable and durable leak-proof attachment of the elastomeric seal can still be provided.

According to a further example a longitudinal thickness of the lid portion in a radial center of the lid portion is larger than a longitudinal thickness of the lid portion at a radial distance from the radial center of the lid portion. In other words, the longitudinal thickness of the lid portion increases from a radial outwardly located region towards the radial center region. The longitudinal thickness of the lid portion may increase continuously, gradually or in discrete steps. Increasing the thickness of the lid portion in a radial center thereof compared to the radial outer region is beneficial to provide a well-defined elastic bending or elastic deformation of the lid portion in the course of a pull off or detachment of the closure cap from the outlet end.

Typically, the sidewall is connected to a radially outwardly located portion of the lid portion. In particular, the sidewall may adjoin the lid portion in a region, in which the lid portion has a minimum thickness. Such a geometric implementation of the lid portion may be of particular benefit. In this way, the flexibility of the lid portion in a radial outer region is larger than the flexibility of the lid portion in a radial central region. This helps to lift or to deform at least a portion of the lid portion in the course of a pull off action of the closure cap from the outlet end.

In the course of a disassembly or detachment of the closure cap from the outlet end only a particular circumferential section of the sidewall and/or of the snap feature may disengage from the radially widened rim. The deformation of the closure cap enables ingress of air in the space between the interior of the cup-shaped receptacle and an exterior of the elastomeric seal and the radially widened rim. This may help to proceed with the detachment of the closure cap from the radially widened rim.

According to a further example the snap feature is located at or near a free end of the fastening portion. The free end of the fastening portion faces away from the retainer portion. Typically, the snap feature is located at an inside of the free end of the fastening portion. The second snap feature is located at a free end of the sidewall, which free end faces away from the retainer portion. In this way, the snap feature is located at a portion or end of the fastening portion or of the sidewall that exhibits a maximum of flexibility because it comprises a maximum distance to the retainer portion or lid portion inherently stabilizing the fastening portion or the sidewall.

According to another example the snap feature comprises a lead-in chamfer or a beveled edge to engage with at least one of the flange portion of the elastomeric seal and the radially widened rim of the outlet end. Typically, the lead-in chamfer faces in proximal direction thus inducing a radial widening or a radially outwardly directed deformation of the snap feature and hence of the fastener, the fastening portion and/or of the sidewall in the course of assembling the closure cap to the outlet end of the barrel.

According to another example the retainer portion and the fastening portion are integrally formed. The cap body is made of a polymeric material and/or the cap body is made of a plastic material. Typically, the closure cap in its entirety can be implemented as an injection molded plastic component. The closure cap may comprise a unitary cap body. The cap body may coincide with the closure cap and may constitute the closure cap. The barrel of the medicament container may comprise or may be made of a vitreous material, such as glass. With some examples the barrel of the medicament container is made of a polymeric material and/or a plastic material. The barrel of the container is typically transparent for electromagnetic radiation in at least one of the visual spectral range, the infrared spectral range and the ultraviolet spectral range.

According to another example the closure cap comprises an outer flange portion protruding radially outwardly from at least one of the retainer portion and the fastening portion. Typically and with some examples the outer flange portion belongs to the lid portion. The retainer portion and the flange portion may constitute the lid portion. Insofar, the flange portion may comprise or may represent a radially outwardly extending extension of the retainer portion. An upper or distally facing outside surface of the outer flange portion may flush with an upper outside surface of the retainer portion and/or of the lid portion.

The outer flange portion may protrude radially outwardly from an outside of the sidewall and hence from an outside of the fastening portion of the cap body.

The radially outwardly extending flange portion enables a well-defined gripping of the cap body in particular for the purpose of detaching the closure cap from the outlet end.

Insofar and according to another example the outer flange portion comprises a lower gripping surface facing towards the fastening portion or facing in proximal longitudinal direction. The lower gripping surface may extend substantially parallel to an outside surface of the lid portion or of the outer flange portion. The lower gripping surface enables a well-defined and intuitive gripping of the closure cap in order to enable an easy and well-defined pull off of the closure cap from the outlet end of the barrel.

According to a further example the outer flange portion comprises an outer rim protruding in longitudinal direction from the lower gripping surface. The outer rim may coincide or may flush with an outer side edge of the flange portion. The outer rim may form a longitudinal extension of the circumferential side edge of the outer flange portion. Typically, the outer rim protrudes in proximal direction from the lower gripping surface of the outer flange portion. The outer rim further stabilizes the outer flange portion. Moreover, the outer rim provides a rather slip-free and good gripping for fingers of a user's hand gripping under the lower gripping surface in order to lift up the closure cap.

Moreover, and according to another example the outer flange portion comprises a number of radially extending struts extending from the fastening portion to the outer rim. Typically, the radially extending struts extend radially outwardly from the fastening portion, e.g. from an outside of the sidewall of the closure cap to the outer rim. The radially extending struts further enhance the stability and/or rigidity of the outer flange portion. Moreover, the radially extending struts help to provide a slip-free gripping of the lower gripping surface by fingers of a user's hand.

According to a further example the fastening portion comprises a tamper evident seal. The tamper evident seal comprises a frangible section. The frangible section comprises at least a first frangible segment and a second frangible segment. The first frangible segment and the second frangible segment are interconnected by a frangible connector. The frangible connector may comprise a structural weakening or a perforation, hence a perforated connection between the first frangible segment and the second frangible segment. The tamper evident seal may be integrally formed with the cap body or may be integrated into the cap body. The tamper evident seal irreversibly breaks or disintegrates upon detachment or disassembly of the closure cap from the outlet end of the barrel. In this way and once the tamper evident seal has been broken, this is a clear indication to a user of the medicament container that the medicament container has been opened before.

The tamper evident closure is of particular use for examples, in which the medicament container is intended to be filled with a medicament. Since the detachable closure cap enables a complete detachment and disassembly of the seal from the outlet end it may be important to indicate, that a closure cap actually assembled and attached to the outlet end of the barrel has been detached from the barrel before. In such situations and once the closure cap has been detached or removed from the outlet end the medicament container may no longer fulfill predefined aseptic or sterile conditions.

Typically, the tamper evident seal may comprise an inner diameter that is adapted to an outer diameter of a stepped down neck of the barrel of the medicament container. The inner diameter of the tamper evident seal in the unbroken and initial condition is smaller than the outer diameter of the radially widened rim at the outlet end of the barrel. Detaching of the closure cap from the outlet end of the barrel requires at least one of a detachment of a frangible section of the tamper evident seal from the sidewall of the closure cap and a detachment or breakage of a frangible connector between frangible segments of the tamper evident seal.

According to another aspect the disclosure relates to a medicament container. The medicament container comprises a barrel comprising an outlet end. The outlet end of the barrel comprises a radially widened rim. The rim is a radially outwardly protruding rim, typically protruding from a stepped down neck portion of the barrel. The medicament container further comprises an elastomeric seal configured to seal the outlet end and comprising a flange portion to abut in a longitudinal or axial direction with the outlet end. The elastomeric seal may comprise an elastomeric stopper configured for insertion into the outlet end. With other examples the elastomeric seal comprises an elastomeric disc-shaped septum configured for abutment with the distal end face of the barrel without entering into an outlet aperture of the barrel.

The medicament container further comprises a closure cap as described above. Here, the retainer portion of the closure cap is engaged with the elastomeric seal. The snap feature of the fastening portion of the closure cap is releasably engaged with the radially widened rim of the outlet end to keep and/or to fix the elastomeric seal in position on or to the outlet end. Typically, the retainer portion, e.g. a proximally facing abutment face, e.g. coinciding with the cup-shaped receptacle formed by the lid portion and the sidewall of the cap body is in tight axial abutment or engagement with a distally facing outside surface of the elastomeric seal. The snap feature is in positive engagement with the proximal end of the radially widened rim of the barrel and keeps and fixes the elastomeric seal in position on the outlet end.

According to a further example a medicament, such as a parenteral drug is arranged inside the barrel. The medicament may comprise a liquid injectable medicament. With other examples the medicament is provided as a dry powder inside the barrel. Here, the dry powder has to be mixed with a solvent or diluent in order to prepare a liquid medicament. Detaching of the closure cap may be of particular use for filling the interior of the barrel with a suitable diluent or solvent.

According to another example the barrel comprises at least one through opening in a region offset from the outlet end. Here, the barrel is configured as a leakage test barrel. The barrel may comprise a leakage test barrel. The through opening may be in a size of 1 μm-100 μm. With other examples the through opening has a transverse size or a diameter between 2 μm and 50 μm. With further examples the at least one through opening comprises a lateral size or a diameter of about 5 μm-15 μm.

The at least one through opening may be a laser drilled through opening in the vitreous material of the barrel. Typically, the through opening extends through a sidewall or through a bottom and/or through a shoulder portion of the barrel. Here, the barrel may be made of a vitreous material. The barrel may comprise a glass barrel.

The detachable arrangement and/or fixing of the elastomeric seal to the outlet end of the barrel as provided by the closure cap is of particular benefit for conducting a series of leakage tests with one and the same particularly prepared barrel. Here, numerous seals may have to be appropriately assembled and fixed to the outlet end of one and the same barrel one after the other. With each barrel seal combination a leakage test, such as a helium leakage test is conducted. For exchanging such elastomeric seals the detachable closure cap is of particular value and benefit.

Generally, the scope of the present disclosure is defined by the content of the claims. The injection device is not limited to specific embodiments or examples but comprises any combination of elements of different embodiments or examples. Insofar, the present disclosure covers any combination of claims and any technically feasible combination of the features disclosed in connection with different examples or embodiments.

In the present context the term 'distal' or 'distal end' relates to an end of the medicament container that faces towards an outlet end or that comprises the outlet end. The term 'proximal' or 'proximal end' relates to an opposite end of the container, which is furthest away from an outlet end.

The term "drug" or "medicament", as used herein, means a pharmaceutical formulation containing at least one pharmaceutically active compound, wherein in one embodiment the pharmaceutically active compound has a molecular weight up to 1500 Da and/or is a peptide, a proteine, a polysaccharide, a vaccine, a DNA, a RNA, an enzyme, an antibody or a fragment thereof, a hormone or an oligonucleotide, or a mixture of the above-mentioned pharmaceutically active compound, wherein in a further embodiment the pharmaceutically active compound is useful for the treatment and/or prophylaxis of diabetes mellitus or complications associated with diabetes mellitus such as diabetic retinopathy, thromboembolism disorders such as deep vein or pulmonary thromboembolism, acute coronary syndrome (ACS), angina, myocardial infarction, cancer, macular degeneration, inflammation, hay fever, atherosclerosis and/or rheumatoid arthritis, wherein in a further embodiment the pharmaceutically active compound comprises at least one peptide for the treatment and/or prophylaxis of diabetes mellitus or complications associated with diabetes mellitus such as diabetic retinopathy, wherein in a further embodiment the pharmaceutically active compound comprises at least one human insulin or a human insulin analogue or derivative, glucagon-like peptide (GLP-1) or an analogue or derivative thereof, or exendin-3 or exendin-4 or an analogue or derivative of exendin-3 or exendin-4.

Insulin analogues are for example Gly(A21), Arg(B31), Arg(B32) human insulin; Lys(B3), Glu(B29) human insulin; Lys(B28), Pro(B29) human insulin; Asp(B28) human insulin; human insulin, wherein proline in position B28 is replaced by Asp, Lys, Leu, Val or Ala and wherein in position B29 Lys may be replaced by Pro; Ala(B26) human insulin; Des(B28-B30) human insulin; Des(B27) human insulin and Des(B30) human insulin.

Insulin derivates are for example B29-N-myristoyl-des(B30) human insulin; B29-N-palmitoyl-des(B30) human insulin; B29-N-myristoyl human insulin; B29-N-palmitoyl human insulin; B28-N-myristoyl LysB28ProB29 human insulin; B28-N-palmitoyl-LysB28ProB29 human insulin; B30-N-myristoyl-ThrB29LysB30 human insulin; B30-N-palmitoyl-ThrB29LysB30 human insulin; B29-N—(N-palmitoyl-Y-glutamyl)-des(B30) human insulin; B29-N—(N-lithocholyl-Y-glutamyl)-des(B30) human insulin; B29-N-(ω-carboxyheptadecanoyl)-des(B30) human insulin and B29-N-(ω-carboxyheptadecanoyl) human insulin.

Exendin-4 for example means Exendin-4(1-39), a peptide of the sequence H-His-Gly-Glu-Gly-Thr-Phe-Thr-Ser-Asp-Leu-Ser-Lys-Gln-Met-Glu-Glu-Glu-Ala-Val-Arg-Leu-Phe-Ile-Glu-Trp-Leu-Lys-Asn-Gly-Gly-Pro-Ser-Ser-Gly-Ala-Pro-Pro-Pro-Ser-NH2.

Exendin-4 derivatives are for example selected from the following list of compounds:

H-(Lys)4-des Pro36, des Pro37 Exendin-4(1-39)-NH2,
H-(Lys)5-des Pro36, des Pro37 Exendin-4(1-39)-NH2,
des Pro36 Exendin-4(1-39),
des Pro36 [Asp28] Exendin-4(1-39),
des Pro36 [IsoAsp28] Exendin-4(1-39),
des Pro36 [Met(O)14, Asp28] Exendin-4(1-39),
des Pro36 [Met(O)14, IsoAsp28] Exendin-4(1-39),
des Pro36 [Trp(O2)25, Asp28] Exendin-4(1-39),
des Pro36 [Trp(O2)25, IsoAsp28] Exendin-4(1-39),
des Pro36 [Met(O)14 Trp(O2)25, Asp28] Exendin-4(1-39),
des Pro36 [Met(O)14 Trp(O2)25, IsoAsp28] Exendin-4(1-39); or
des Pro36 [Asp28] Exendin-4(1-39),
des Pro36 [IsoAsp28] Exendin-4(1-39),
des Pro36 [Met(O)14, Asp28] Exendin-4(1-39),
des Pro36 [Met(O)14, IsoAsp28] Exendin-4(1-39),
des Pro36 [Trp(O2)25, Asp28] Exendin-4(1-39),
des Pro36 [Trp(O2)25, IsoAsp28] Exendin-4(1-39),
des Pro36 [Met(O)14 Trp(O2)25, Asp28] Exendin-4(1-39),
des Pro36 [Met(O)14 Trp(O2)25, IsoAsp28] Exendin-4(1-39),
wherein the group -Lys6-NH2 may be bound to the C-terminus of the Exendin-4 derivative;
or an Exendin-4 derivative of the sequence
des Pro36 Exendin-4(1-39)-Lys6-NH2 (AVE0010),
H-(Lys)6-des Pro36 [Asp28] Exendin-4(1-39)-Lys6-NH2,
des Asp28 Pro36, Pro37, Pro38Exendin-4(1-39)-NH2,
H-(Lys)6-des Pro36, Pro38 [Asp28] Exendin-4(1-39)-NH2,
H-Asn-(Glu)5des Pro36, Pro37, Pro38 [Asp28] Exendin-4(1-39)-NH2,
des Pro36, Pro37, Pro38 [Asp28] Exendin-4(1-39)-(Lys)6-NH2,
H-(Lys)6-des Pro36, Pro37, Pro38 [Asp28] Exendin-4(1-39)-(Lys)6-NH2,
H-Asn-(Glu)5-des Pro36, Pro37, Pro38 [Asp28] Exendin-4(1-39)-(Lys)6-NH2,
H-(Lys)6-des Pro36 [Trp(O2)25, Asp28] Exendin-4(1-39)-Lys6-NH2,
H-des Asp28 Pro36, Pro37, Pro38 [Trp(O2)25] Exendin-4(1-39)-NH2,
H-(Lys)6-des Pro36, Pro37, Pro38 [Trp(O2)25, Asp28] Exendin-4(1-39)-NH2,
H-Asn-(Glu)5-des Pro36, Pro37, Pro38 [Trp(O2)25, Asp28] Exendin-4(1-39)-NH2,
des Pro36, Pro37, Pro38 [Trp(O2)25, Asp28] Exendin-4(1-39)-(Lys)6-NH2,
H-(Lys)6-des Pro36, Pro37, Pro38 [Trp(O2)25, Asp28] Exendin-4(1-39)-(Lys)6-NH2,
H-Asn-(Glu)5-des Pro36, Pro37, Pro38 [Trp(O2)25, Asp28] Exendin-4(1-39)-(Lys)6-NH2,
H-(Lys)6-des Pro36 [Met(O)14, Asp28] Exendin-4(1-39)-Lys6-NH2,
des Met(O)14 Asp28 Pro36, Pro37, Pro38 Exendin-4(1-39)-NH2,
H-(Lys)6-desPro36, Pro37, Pro38 [Met(O)14, Asp28] Exendin-4(1-39)-NH2,
H-Asn-(Glu)5-des Pro36, Pro37, Pro38 [Met(O)14, Asp28] Exendin-4(1-39)-NH2,
des Pro36, Pro37, Pro38 [Met(O)14, Asp28] Exendin-4(1-39)-(Lys)6-NH2,
H-(Lys)6-des Pro36, Pro37, Pro38 [Met(O)14, Asp28] Exendin-4(1-39)-(Lys)6-NH2,
H-Asn-(Glu)5 des Pro36, Pro37, Pro38 [Met(O)14, Asp28] Exendin-4(1-39)-(Lys)6-NH2,
H-Lys6-des Pro36 [Met(O)14, Trp(O2)25, Asp28] Exendin-4(1-39)-Lys6-NH2,
H-des Asp28 Pro36, Pro37, Pro38 [Met(O)14, Trp(O2)25] Exendin-4(1-39)-NH2,
H-(Lys)6-des Pro36, Pro37, Pro38 [Met(O)14, Asp28] Exendin-4(1-39)-NH2,
H-Asn-(Glu)5-des Pro36, Pro37, Pro38 [Met(O)14, Trp(O2)25, Asp28] Exendin-4(1-39)-NH2,
des Pro36, Pro37, Pro38 [Met(O)14, Trp(O2)25, Asp28] Exendin-4(1-39)-(Lys)6-NH2,
H-(Lys)6-des Pro36, Pro37, Pro38 [Met(O)14, Trp(O2)25, Asp28] Exendin-4(S1-39)-(Lys)6-NH2,
H-Asn-(Glu)5-des Pro36, Pro37, Pro38 [Met(O)14, Trp(O2)25, Asp28] Exendin-4(1-39)-(Lys)6-NH2;
or a pharmaceutically acceptable salt or solvate of any one of the afore-mentioned Exendin-4 derivative.

Hormones are for example hypophysis hormones or hypothalamus hormones or regulatory active peptides and their antagonists as listed in Rote Liste, ed. 2008, Chapter 50, such as Gonadotropine (Follitropin, Lutropin, Choriongonadotropin, Menotropin), Somatropine (Somatropin), Desmopressin, Terlipressin, Gonadorelin, Triptorelin, Leuprorelin, Buserelin, Nafarelin, Goserelin.

A polysaccharide is for example a glucosaminoglycane, a hyaluronic acid, a heparin, a low molecular weight heparin or an ultra low molecular weight heparin or a derivative thereof, or a sulphated, e.g. a poly-sulphated form of the above-mentioned polysaccharides, and/or a pharmaceutically acceptable salt thereof. An example of a pharmaceutically acceptable salt of a poly-sulphated low molecular weight heparin is enoxaparin sodium.

Antibodies are globular plasma proteins (~150 kDa) that are also known as immunoglobulins which share a basic structure. As they have sugar chains added to amino acid residues, they are glycoproteins. The basic functional unit of each antibody is an immunoglobulin (Ig) monomer (containing only one Ig unit); secreted antibodies can also be dimeric with two Ig units as with IgA, tetrameric with four Ig units like teleost fish IgM, or pentameric with five Ig units, like mammalian IgM.

The Ig monomer is a "Y"-shaped molecule that consists of four polypeptide chains; two identical heavy chains and two identical light chains connected by disulfide bonds between cysteine residues. Each heavy chain is about 440 amino acids long; each light chain is about 220 amino acids long. Heavy and light chains each contain intrachain disulfide bonds which stabilize their folding. Each chain is composed of structural domains called Ig domains. These domains contain about 70-110 amino acids and are classified into different categories (for example, variable or V, and constant or C) according to their size and function. They have a characteristic immunoglobulin fold in which two β sheets create a "sandwich" shape, held together by interactions between conserved cysteines and other charged amino acids.

There are five types of mammalian Ig heavy chain denoted by α, δ, ε, γ, and μ. The type of heavy chain present defines the isotype of antibody; these chains are found in IgA, IgD, IgE, IgG, and IgM antibodies, respectively.

Distinct heavy chains differ in size and composition; α and γ contain approximately 450 amino acids and δ approximately 500 amino acids, while μ and ε have approximately 550 amino acids. Each heavy chain has two regions, the constant region ($C_H$) and the variable region ($V_H$). In one species, the constant region is essentially identical in all antibodies of the same isotype, but differs in antibodies of different isotypes. Heavy chains γ, α and δ have a constant region composed of three tandem Ig domains, and a hinge region for added flexibility; heavy chains μ and ε have a constant region composed of four immunoglobulin domains. The variable region of the heavy chain differs in antibodies produced by different B cells, but is the same for all antibodies produced by a single B cell or B cell clone. The variable region of each heavy chain is approximately 110 amino acids long and is composed of a single Ig domain.

In mammals, there are two types of immunoglobulin light chain denoted by λ and κ. A light chain has two successive domains: one constant domain (CL) and one variable domain (VL). The approximate length of a light chain is 211 to 217 amino acids. Each antibody contains two light chains that are always identical; only one type of light chain, K or A, is present per antibody in mammals.

Although the general structure of all antibodies is very similar, the unique property of a given antibody is determined by the variable (V) regions, as detailed above. More specifically, variable loops, three each the light (VL) and three on the heavy (VH) chain, are responsible for binding to the antigen, i.e. for its antigen specificity. These loops are referred to as the Complementarity Determining Regions (CDRs). Because CDRs from both VH and VL domains contribute to the antigen-binding site, it is the combination of the heavy and the light chains, and not either alone, that determines the final antigen specificity.

An "antibody fragment" contains at least one antigen binding fragment as defined above, and exhibits essentially the same function and specificity as the complete antibody of which the fragment is derived from. Limited proteolytic digestion with papain cleaves the Ig prototype into three fragments. Two identical amino terminal fragments, each containing one entire L chain and about half an H chain, are the antigen binding fragments (Fab). The third fragment, similar in size but containing the carboxyl terminal half of both heavy chains with their interchain disulfide bond, is the crystalizable fragment (Fc). The Fc contains carbohydrates, complement-binding, and FcR-binding sites. Limited pepsin digestion yields a single F(ab')2 fragment containing both Fab pieces and the hinge region, including the H—H interchain disulfide bond. F(ab')2 is divalent for antigen binding. The disulfide bond of F(ab')2 may be cleaved in order to obtain Fab'. Moreover, the variable regions of the heavy and light chains can be fused together to form a single chain variable fragment (scFv).

Pharmaceutically acceptable salts are for example acid addition salts and basic salts. Acid addition salts are e.g. HCl or HBr salts. Basic salts are e.g. salts having a cation selected from alkali or alkaline, e.g. Na+, or K+, or Ca2+, or an ammonium ion N+(R1)(R2)(R3)(R4), wherein R1 to R4 independently of each other mean: hydrogen, an optionally substituted C1-C6-alkyl group, an optionally substituted C2-C6-alkenyl group, an optionally substituted C6-C10-aryl group, or an optionally substituted C6-C10-heteroaryl group. Further examples of pharmaceutically acceptable salts are described in "Remington's Pharmaceutical Sciences" 17. ed. Alfonso R. Gennaro (Ed.), Mark Publishing Company, Easton, Pa., U.S.A., 1985 and in Encyclopedia of Pharmaceutical Technology.

Pharmaceutically acceptable solvates are for example hydrates.

It will be further apparent to those skilled in the art that various modifications and variations can be made to the present disclosure without departing from the scope of the disclosure. Further, it is to be noted, that any reference numerals used in the appended claims are not to be construed as limiting the scope of the disclosure.

BRIEF DESCRIPTION OF THE FIGURES

In the following, numerous examples of the injection device comprising a filling level indicator will be described in greater detail by making reference to the drawings, in which.

DETAILED DESCRIPTION

Figure 1:
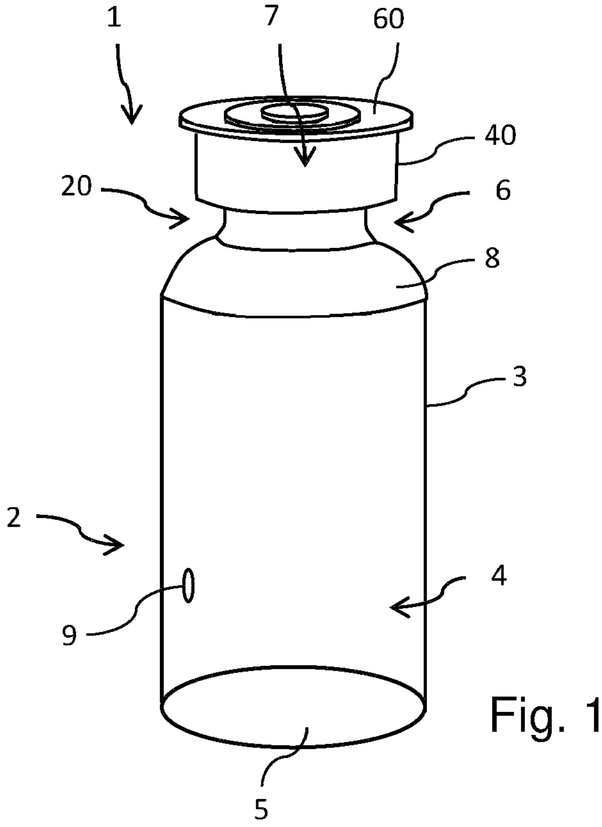
FIG. 1 is a schematic perspective illustration of a medicament container implemented as a leakage test container.

In FIG. 1 one example of the medicament container 1 is illustrated. The medicament container may be implemented as a bottle or vial. The medicament container 1 comprises a barrel 2 comprising a substantially cylindrical sidewall 3. The sidewall 3 is confined towards a proximal direction by a bottom 5. The bottom 5 is of substantially circular geometry. Opposite to the bottom 5 the sidewall 3 extends into a radially narrowing shoulder portion 8. The shoulder portion 8 extends in longitudinal and distal direction into a stepped down neck portion 6. The neck portion 6 has a rather constant diameter as seen in longitudinal or in distal direction.

Figure 4:
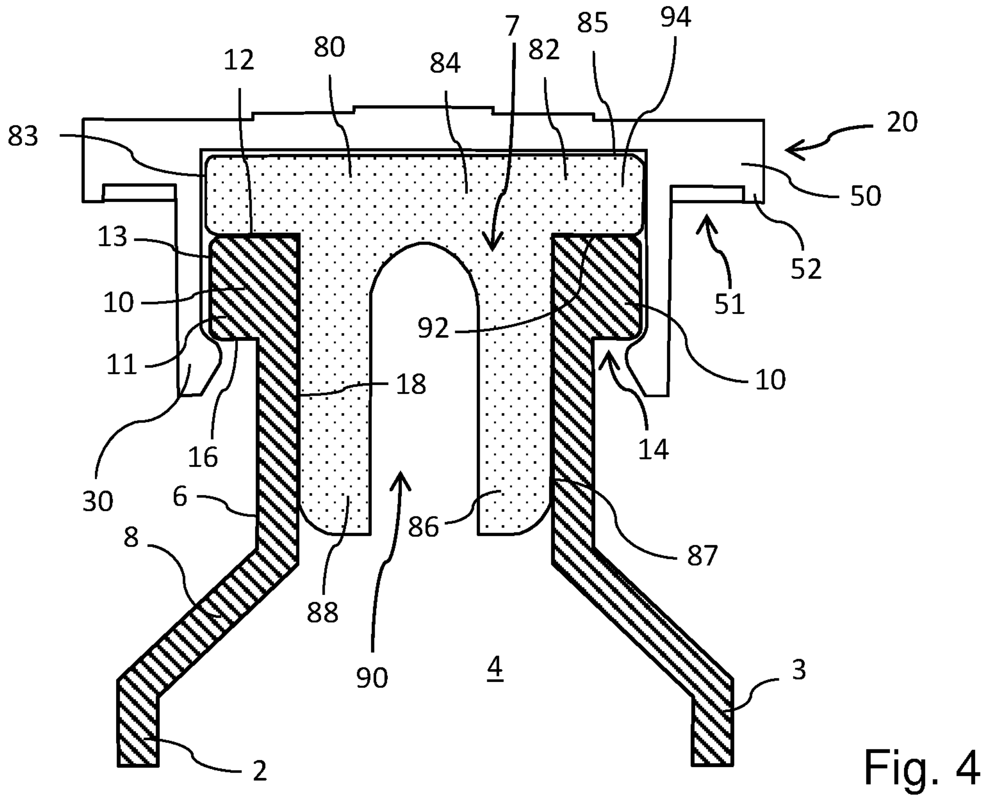
FIG. 4 is a longitudinal cut through the closure cap when assembled to the outlet end of the barrel.

At the very end the barrel 2 comprises an outlet end 7. At the outlet end the barrel 2 comprises a radially widened rim 11. The inside surface 18 in the region of the neck portion 6 extends unaltered towards the distal end face 12 of the barrel 2 as illustrated in FIG. 4. The radially widened outer rim 11 is only provided on an outside surface of the barrel 2. The inside surface 18 of the head portion 10 and the proximally adjacently located neck portion 6 is rather constant in diameter or cross section as seen in longitudinal direction.

Such a tubular shape of the inside surface 18 is particularly configured to receive a correspondingly and tubular-shaped insert section 86 of an elastomeric seal 80 as illustrated in FIG. 4. The elastomeric seal 80, typically comprising a stopper 82 or stopper body made of an elastomeric material, such as natural or synthetic rubber is insertable into the outlet end 7 of the barrel 2. The seal 80 and the stopper 82 serves to seal the outlet end 7 of the barrel in a liquid tight and/or gas tight manner. The seal 80 comprises a radially outwardly extending flange portion 94. The flange portion 94 comprises a proximal surface 92 that abuts with a correspondingly-shaped distal end face 12 of the head portion 10 of the barrel 2.

The radial extension of the flange portion 94 substantially equals the radial extension of the distal end face 12. Insofar the entirety of the distal end face 12 of the barrel 2 may be covered and may be in sealed engagement with the proximal surface 92 of the flange portion 94. In addition, the outside surface 87 of the insert section 86 is in sealing engagement with the inside surface 18 of the combined head portion 10 and neck portion 6. Also here, a liquid tight and/or gas tight seal between the seal 80 and the outlet end 7 of the barrel 2 can be obtained.

As indicated further in FIG. 4, a radial outside surface 13 of the head portion 10 of the barrel 2 substantially flushes in longitudinal or axial direction with the radially outwardly facing outside surface 83 of the seal 80 or stopper 82.

In addition and as illustrated in FIG. 4, the insert section 87 of the stopper 82 comprises a centrally located hollow section 90. In other words, a radial central portion of the upper or distal end section of the seal 80 comprises a reduced longitudinal thickness compared to a radially outwardly located portion of the insert section 86. Insofar, the insert section 86 comprises a somewhat tubular-shaped sidewall 88 with a hollow longitudinal interior 90. In this way, and when accessible from outside, the radial central region of the seal 80 may be easily penetrable by a piercing assembly, such as a cannula or an injection needle.

The seal 80 or the stopper 82 is typically made of a chlorobutyl rubber or a bromobutyl rubber or combinations thereof.

Figure 2:
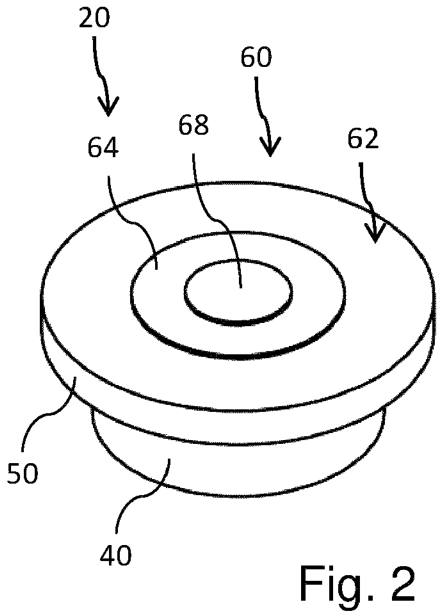
FIG. 2 is an isolated perspective view of the closure cap.
Figure 3:
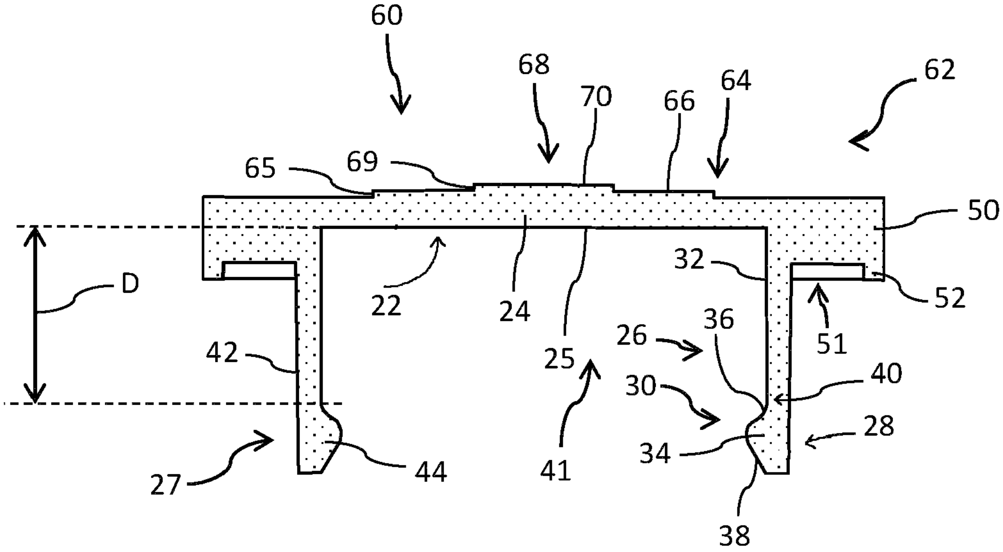
FIG. 3 is a cross-section through the closure cap of FIG. 2.

In order to provide a detachable seal for the medicament container 1 the medicament container 1 further comprises a detachable closure cap 20 as illustrated in greater detail in FIGS. 2 and 3. The cap 20 comprises a cap body 22. The cap body 22 comprises a somewhat disc-shaped retainer portion 24 forming or contributing to an upper lid portion 60. The retainer portion 24 comprises a proximally facing abutment face 25, which in an intended assembly configuration as illustrated in FIG. 4, is in surface abutment or surface pressure with the upper or distally facing outside surface 85 of the seal 80.

The cap body 22 further comprises a fastening portion 26 extending away from the lower or proximal side of the retainer portion 24. The fastening portion 26 comprises a resiliently and radially deformable fastener 28. The fastener 28 comprises a snap feature 30. The snap feature 30 is configured to releasably engage with the radially widened rim 11 of the outlet end 7 as illustrated in FIG. 4. In the presently illustrated example the fastening portion 26 and the fastener 28 are integrated into a tubular-shaped sidewall 40. The sidewall 40 is integrally formed with the retainer portion 24 of the cap body 22. Moreover, the retainer portion 24 and the lid portion 60 as well as the sidewall 40 may be integrally formed. The cap body 22 may comprise or may consist of a unitary, e.g. injection molded plastic component, which is easy to manufacture and to assemble. Moreover, an injection molded cap body is manufacturable at moderate or low cost and in large quantities.

As particularly illustrated in FIG. 3 the snap feature 30 is located at a longitudinal distance D from the retainer portion 24. In particular, the snap feature 30 is located or separated by the longitudinal or axial distance D from the proximally facing abutment face 25 of the retainer portion 24 or of the lid portion 60. The longitudinal or axial distance D is sized such that the seal 80 when appropriately arranged on or in the outlet end 7 is kept in a slack-free way to the outlet end 7. With some examples the longitudinal distance D is slightly smaller than the sum of the longitudinal extension of the flange portion 94 and the longitudinal extension of the radially widened rim 11.

In this way, establishing of a snap fit connection between the snap feature 30 and the recessed portion 14 at the proximal end of the radially widened rim 11 is only possible with an at least slight axial or longitudinal squeezing of the seal 80. In this way, a well-defined surface pressure between the proximal surface 92 of the seal 80 and the distal end face 12 of the barrel 2 can be obtained.

The snap feature 30 comprises a radially inwardly extending protrusion 34. The protrusion 34 protrudes radially inwardly from an inside surface 32 of the sidewall 40. The radially inwardly extending protrusion 34 is located at or near a proximal or free end 27 of the fastening portion 26, of the fastener 28 and/or of the sidewall 40. As indicated further in FIG. 3, the protrusion 34 comprises a distally facing beveled edge 36 and a proximally facing lead-in chamfer 38. The lead-in chamfer 38 is also a beveled edge. The inclination of the distally facing beveled edge 36 is somewhat steeper than the inclination of the lead-in chamfer 38. The lead-in chamfer 38 serves to induce a radial widening or radially outwardly directed deformation of the snap feature 30 in the course of urging the closure cap 20 from above onto the seal 80 already assembled to the outlet end 7. Here, the lead-in chamfer 38 may engage a radial outwardly located edge of the outside surface 85 of the seal during the assembly of the closure cap 20 to the barrel 2 and the seal 80.

The beveled edge 36 is configured to induce a radial widening or a radially outwardly directed deformation of the snap feature 30 and hence of the fastening portion 26, the fastener 28 and/or of the sidewall 40 when the closure cap 20 is detached from the barrel 2. Here and as indicated in FIG. 4, the beveled edge 36 is in engagement with a proximal edge of the radially widened rim 11. As the closure cap 20 is pulled off from the outlet end in distal direction relative to the barrel 2 the beveled edge 36 induces a respective radially outwardly directed deformation as the radially inwardly extending protrusion 34 slides along the outside surface 13 of the radially widened rim 11.

The snap feature 30 may comprise numerous radially inwardly extending protrusions 34 distributed across the inside facing inside surface 32 of the sidewall 40. With some examples the snap feature 30 comprises a circumferential rim 44 protruding radially inwardly from the sidewall 40.

Figure 5:
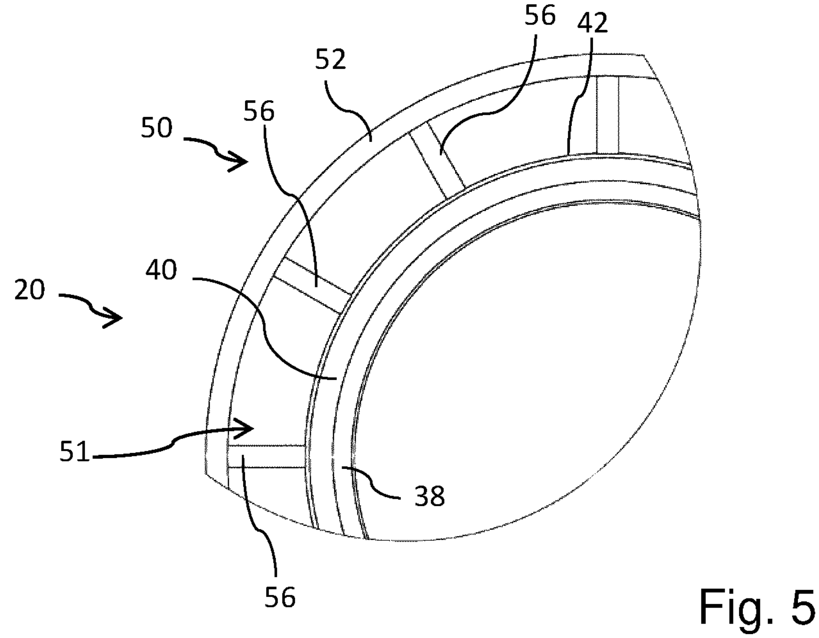
FIG. 5 is a partial view of the lower gripping surface of the outer flange portion of the closure cap as seen from below.

As further illustrated in FIGS. 3 and 5 the lid portion 60 forms a cup-shaped receptacle 41 with the sidewall 40. Moreover, the lid portion 60 comprises a radially outwardly extending outer flange 50 extending radially outwardly from an outside surface 42 of the sidewall 40. The outer flange or outer flange portion 50 may also be integrally formed with the retainer portion 24 and the sidewall 40. The outer flange portion 50 is also integrated into the cap body 22. The outer flange portion 50 comprises a gripping surface 51 protruding radially outwardly from the outside surface 42 of the sidewall 40. The gripping surface 51 faces towards the sidewall 42. The outer flange portion 50 is a radially outwardly extending extension of the retainer portion 24. The upper or distally facing surface of the flange portion 50 flushes in radial direction with the outside surface 62 of the lid portion 60. The oppositely located gripping surface faces in proximal direction. As illustrated in FIG. 5, the gripping surface 51 is provided with an outer rim 52. The outer rim 52 protrudes in proximal direction and hence towards the outside surface 42 of the sidewall 40 on the radial outside edge of the flange portion 50. The outer rim 52 serves to provide a slip-free gripping of the lower gripping surface 51 as a user intends to lift the closure cap 20 in the course of detaching the closure cap from the outlet end 7 of the barrel 2.

As indicated in FIG. 5 there are provided numerous spokes or struts 56 extending radially inwardly from the outer rim 52. Also these struts 56 protrude in longitudinal direction from the lower gripping surface 51. The struts 56 may be arranged equidistantly along the outer circumference of the outside surface 42. The struts 56 are configured to provide a mechanical stabilization and to increase rigidity of the flange portion 50.

Figure 6:
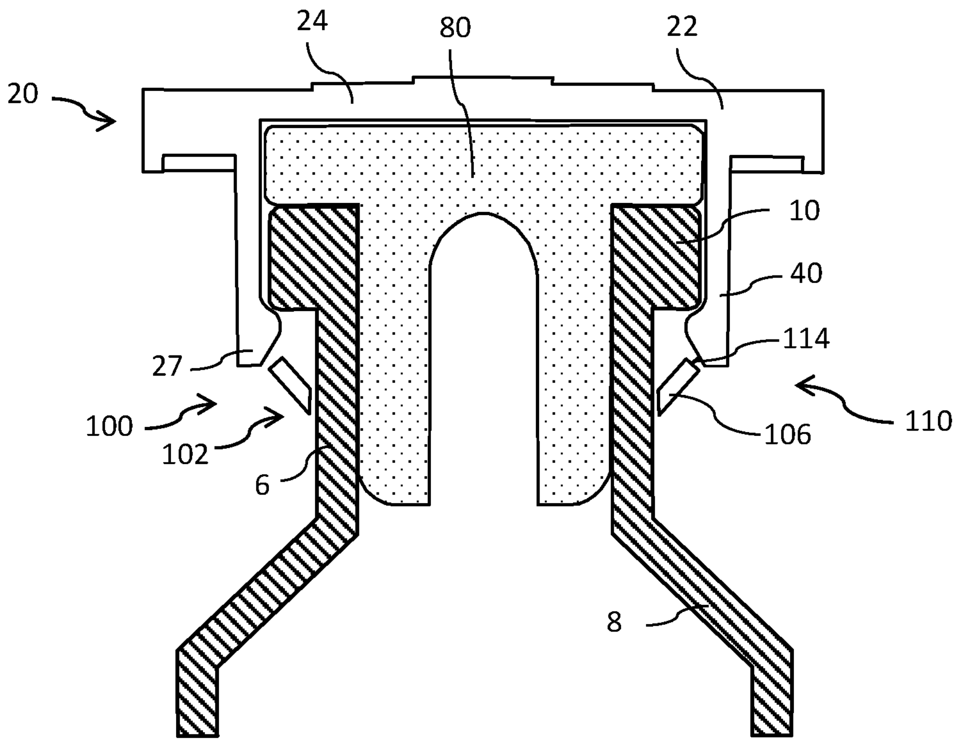
FIG. 6 is a cross-section through a further example of the closure cap equipped with a tamper evident seal and FIG. 7 schematically illustrates the structure of one example of a tamper evident seal.
Figure 7:
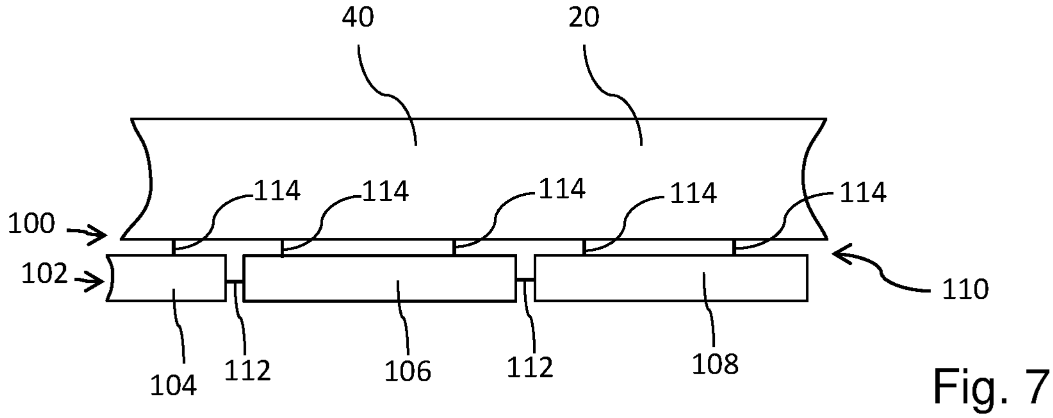

As illustrated further in FIG. 6 the closure cap 20 is equipped with a tamper evident seal 100. The tamper evident seal 100 comprises a frangible section 102. The frangible section 102 in turn may comprise at least a first frangible segment 104 and a second frangible segment 106. In the schematic illustration of the tamper evident seal 100 as shown in FIG. 7 the frangible section also comprises a third frangible segment 108. The frangible segments 104, 106, 108 are mutually interconnected by a frangible connectors 112. In the example of FIG. 7 each one of the frangible segments is also frangibly connected to the sidewall 40 of the closure cap 20. For this, there are provided further frangible connectors 114.

As further indicated in FIG. 6, the frangible section is located at the free end 27 of the sidewall and may protrude in proximal direction from the sidewall 40. An inner diameter of the frangible section 102 may be adapted to receive the radially stepped down neck portion 6 of the barrel 2. However, the inner diameter of the frangible section 102 is smaller than the outer diameter of the radially widened rim 11. Hence for detaching the closure cap from the outlet end 7 at least one of the frangible connectors 112, 114 has to break in order to enable the disintegrated frangible section to slip over or to pass by the radially widened rim 11.

The tamper evident seal may be integrally formed with the closure cap. With some examples it may be welded to the closure cap or connected to the closure cap by means of an adhesive.

Use of a tamper evident seal 100 is of particular benefit when the medicament container 1 contains a medicament, either in liquid or powdered form. With other examples and as illustrated in FIG. 1 such a tamper evident seal 100 may not be required. There, in FIG. 1 the barrel 2 of the medicament container 1 comprises at least one or several through openings 9 in a region remote or offset from the outlet end 7. The through opening 9 may be a laser drilled or laser generated hole of predefined size in the sidewall 3, in the shoulder portion 8, in the neck portion 6 or in the bottom 5 of the barrel 2. Such at least one dedicated and well-defined through opening is required to conduct a gas leakage test of the medicament container with the outlet end 7 sealed by the elastomeric seal 80. The detachable and re-attachable closure cap 20 enables to replace numerous seals 80 one after the other for the purpose of leakage testing while using one and the same barrel 2. The detachable closure cap 20 is beneficial in terms of avoiding breakage or damage of the barrel when detaching the closure cap for elastomeric seal replacement.

LIST OF REFERENCE NUMBERS

1 medicament container
2 barrel
3 sidewall
4 interior volume
5 bottom
6 neck portion
7 outlet end
8 shoulder portion
9 through opening
10 head portion
11 rim
12 distal end face
13 outside surface
14 recessed portion
16 contact surface/abutment face
18 inside surface
20 closure cap
22 cap body
24 retainer portion
25 abutment face
26 fastening portion
27 free end
28 fastener
30 snap feature
32 inside surface
34 protrusion
36 beveled edge
38 lead-in chamfer
40 sidewall
41 receptacle
42 outside surface
44 rim
50 outer flange portion
51 gripping surface
52 outer rim
56 strut
60 lid portion
62 outside surface
64 pedestal section
65 pedestal flank
66 pedestal top
68 pedestal section
69 pedestal flank
70 pedestal top
80 seal
82 stopper
83 outside surface
84 stopper body
85 outside surface
86 insert section
87 outside surface
88 sidewall
90 hollow section
92 proximal surface
94 flange portion
100 tamper evident seal
102 frangible section
104 segment
106 segment
108 segment
110 perforated connection
112 frangible connector
114 frangible connector

The invention claimed is:

1. A closure cap for sealing an outlet end of a barrel of a medicament container, the outlet end having a radially widened rim and the outlet end being sealable by an elastomeric seal, wherein the elastomeric seal comprises a flange portion configured to abut in a longitudinal direction with the outlet end, the closure cap comprising:

a cap body comprising a retainer portion, a fastening portion, and an outer flange portion, wherein the retainer portion is configured to engage with the elastomeric seal, wherein the fastening portion comprises a resiliently and radially deformable fastener comprising a snap feature configured to releasably engage with the radially widened rim of the outlet end, wherein a longitudinal distance between the retainer portion and the snap feature is sized to receive the radially widened rim of the outlet end and the flange portion of the elastomeric seal between the retainer portion and the snap feature, wherein the outer flange portion protrudes radially outwardly from at least one of the retainer portion or the fastening portion, wherein the outer flange portion comprises a lower gripping surface facing towards the fastening portion, and wherein the outer flange portion comprises an outer rim protruding in the longitudinal direction from the lower gripping surface.

2. The closure cap according to claim 1, wherein the longitudinal distance between the retainer portion and the snap feature is less than or equal to a sum of a longitudinal extension of the radially widened rim of the outlet end and a longitudinal thickness of the flange portion of the elastomeric seal.

3. The closure cap according to claim 1, wherein the cap body comprises a lid portion and a sidewall, the lid portion and the sidewall forming a cup-shaped receptacle configured to receive the radially widened rim of the outlet end and the flange portion of the elastomeric seal, wherein the retainer portion at least partially forms the lid portion, and wherein the fastening portion and the fastener are integrated into the sidewall.

4. The closure cap according to claim 3, wherein the snap feature comprises a protrusion protruding from an inside surface of the sidewall.

5. The closure cap according to claim 3, wherein the sidewall is of a tubular shape and wherein the snap feature comprises a radially inwardly protruding rim.

6. The closure cap according to claim 3, wherein a longitudinal thickness of the lid portion in a radial center of the lid portion is larger than a longitudinal thickness of the lid portion at a radial distance from the radial center of the lid portion.

7. The closure cap according to claim 1, wherein the snap feature is located at or near a free end of the fastening portion, the free end facing away from the retainer portion, and wherein the snap feature comprises a lead-in chamfer to engage with at least one of the flange portion of the elastomeric seal or the radially widened rim of the outlet end.

8. The closure cap according to claim 1, wherein the retainer portion and the fastening portion are integrally formed and wherein the cap body is made of a polymeric material or is made of a plastic material.

9. The closure cap according to claim 1, wherein the outer flange portion comprises a number of radially extending struts extending from the fastening portion to the outer rim.

10. The closure cap according to claim 1, wherein the fastening portion comprises a tamper evident seal, the tamper evident seal comprises a frangible section, the frangible section comprising at least a first frangible segment and a second frangible segment, wherein the first frangible segment and the second frangible segment are interconnected by a frangible connector.

11. A medicament container comprising:

a barrel comprising an outlet end, wherein the outlet end has a radially widened rim, an elastomeric seal configured to seal the outlet end and comprising a flange portion to abut in a longitudinal direction with the outlet end, and a closure cap, comprising:

a cap body comprising a retainer portion, a fastening portion, and an outer flange portion, wherein the retainer portion is engaged with the elastomeric seal, wherein the fastening portion comprises a resiliently and radially deformable fastener comprising a snap feature releasably engaged with the radially widened rim of the outlet end to keep the elastomeric seal in position on the outlet end, wherein a longitudinal distance between the retainer portion and the snap feature is sized to receive the radially widened rim of the outlet end and the flange portion of the elastomeric seal between the retainer portion and the snap feature, wherein the outer flange portion protrudes radially outwardly from at least one of the retainer portion or the fastening portion, wherein the outer flange portion comprises a lower gripping surface facing towards the fastening portion, and wherein the outer flange portion comprises an outer rim protruding in the longitudinal direction from the lower gripping surface.

12. The medicament container according to claim 11, wherein a medicament is arranged inside the barrel.

13. The medicament container according to claim 11, wherein the barrel comprises at least one through opening in a region offset from the outlet end.

14. The medicament container according to claim 11, wherein the cap body comprises a lid portion and a sidewall, the lid portion and the sidewall forming a cup-shaped receptacle in which the radially widened rim of the outlet end and the flange portion of the elastomeric seal is received, wherein the retainer portion at least partially forms the lid portion, and wherein the fastening portion and the fastener are integrated into the sidewall.

15. The medicament container according to claim 14, wherein the snap feature comprises a protrusion protruding from an inside surface of the sidewall.

16. The medicament container according to claim 11, wherein the snap feature is located at or near a free end of the fastening portion, the free end facing away from the retainer portion, and wherein the snap feature comprises a lead-in chamfer to engage with at least one of the flange portion of the elastomeric seal or the radially widened rim of the outlet end.

17. The medicament container according to claim 11, wherein the fastening portion comprises a tamper evident seal, the tamper evident seal comprises a frangible section, the frangible section comprising at least a first frangible segment and a second frangible segment, wherein the first frangible segment and the second frangible segment are interconnected by a frangible connector.

18. A closure cap for sealing an outlet end of a barrel of a medicament container, the outlet end having a radially widened rim and the outlet end being sealable by an elastomeric seal, wherein the elastomeric seal comprises a flange portion configured to abut in a longitudinal direction with the outlet end, the closure cap comprising:

a cap body comprising a lid portion and a sidewall, the lid portion forming a cup-shaped receptacle configured to receive the radially widened rim of the outlet end and the flange portion of the elastomeric seal, wherein the lid portion is configured to engage with the elastomeric seal, wherein the sidewall comprises a resiliently and radially deformable fastener comprising a snap feature configured to releasably engage with the radially widened rim of the outlet end, and wherein a longitudinal distance between the lid portion and the snap feature is sized to receive the radially widened rim of the outlet end and the flange portion of the elastomeric seal between the lid portion and the snap feature, and wherein a longitudinal thickness of the lid portion in a radial center of the lid portion is larger than a longitudinal thickness of the lid portion at a radial distance from the radial center of the lid portion.

* * * * *